United States Patent [19]
Ottman et al.

[11] Patent Number: 4,984,989
[45] Date of Patent: Jan. 15, 1991

[54] FLUID POWER DEMONSTRATION FACILITY

[75] Inventors: Rick Ottman, Milwaukee; Don Wiberg, Brookfield; Jack Johnson, Milwaukee; Thomas S. Wanke, Menomonee Falls; Thomas W. Davis, Grafton, all of Wis.

[73] Assignee: Milwaukee School of Engineering, Milwaukee, Wis.

[21] Appl. No.: 404,338

[22] Filed: Sep. 7, 1989

[51] Int. Cl.$^5$ ............................................. G09B 25/00
[52] U.S. Cl. .................................................... 434/401
[58] Field of Search .......................... 434/401; 901/22; 414/699, 708; 91/433

[56] References Cited

U.S. PATENT DOCUMENTS

| | | | |
|---|---|---|---|
| 3,905,501 | 9/1975 | Leroux | 414/708 X |
| 4,271,749 | 6/1981 | Pease | 91/433 X |
| 4,378,959 | 4/1983 | Susnjara | 901/22 X |
| 4,598,626 | 7/1986 | Walters et al. | 91/433 |

Primary Examiner—Robert Bahr
Assistant Examiner—Jennifer L. Doyle
Attorney, Agent, or Firm—Michael, Best & Friedrich

[57] ABSTRACT

The invention provides a fluid power demonstration facility comprising means defining a fluid power source, directing means in fluid communication with the fluid power source and for selectively supplying fluid power from the fluid power source, pre-arranged rotary means, in fluid communication with the directing means, for demonstrating rotational motion produced in response to fluid power, and adapted to be selectively engageable by the directing means, and pre-arranged linear means, in fluid communication with the directing means, for demonstrating linear motion produced in response to fluid power, selectively engageable by the control means, and separate from the means for demonstrating rotational motion.

53 Claims, 2 Drawing Sheets

FLUID POWER DEMONSTRATION FACILITY

BACKGROUND OF THE INVENTION

The invention relates generally to fluid power and, more particularly, to apparatus for using electrical devices to control and monitor hydraulically operated devices in a laboratory environment.

Previously, students studying fluid power and hydraulics have generally performed mathematical analyses of theoretical hydraulic systems with little practical exposure to an actual physically existing system.

The prior art does provide a practical hydraulic demonstration assembly comprising a small scale hydraulic power source, and separate, selectively attachable components such as valves, sensors, hoses, hydraulic motors, and linear devices operative in response to hydraulic power for producing linear motion and comprising, for example, a plurality of weights. A portion of the plurality of weights can generally be selected, and hydraulic power from the hydraulic power source is used to apply a force to the selected weights in a linear, monoaxial, generally vertical direction. A Problem associated with this prior art demonstration assembly is that assembly of the various components is time consuming. A further problem is that the various components generally have to be rearranged when different experiments are being performed, such as when a linear motion experiment is desired after a rotational motion experiment has been performed. No attempt is made to monitor the temperature of the hydraulic motor or to cool the motor of the prior art assembly. Sophisticated linear motion, along more than one axis, is not possible with the linear devices of the prior art demonstration assembly.

SUMMARY OF THE INVENTION

The invention provides a fluid power demonstration facility comprising means defining a fluid power source, directing means connected in fluid communication with the fluid power source for selectively supplying fluid power from the fluid power source, pre-arranged rotary means selectively plumbed with the directing means, for selective engagement by said directing means, for demonstrating rotational motion produced in response to fluid power, and pre-arranged linear means in plumbed connection with the directing means, and selectively engageable by the directing means, for demonstrating linear motion produced in response to fluid power.

In one aspect of the invention, a hydraulic demonstration facility is provided comprising means defining a hydraulic power source, a hydraulic motor in fluid communication with the hydraulic power source and including an elongated shaft which is rotatable in response to hydraulic power being supplied to the hydraulic motor from the hydraulic power source, a load valve, and a hydraulic pump in fluid communication with said load valve, driven by the shaft and supercharged by the hydraulic power source, thereby defining a load on the hydraulic power source.

In another aspect of the invention, a hydraulic demonstration facility is provided comprising means defining a hydraulic power source, and a hydraulically operable robotic arm including a first arm member, a second arm member pivotally mounted to the first arm member, and a hydraulic cylinder which is connected between the first arm member and the second arm member to effect pivotal movement of the second arm member with respect to the first arm member, the hydraulic cylinder changing from being in tension to being in compression during its stroke.

Other features and advantages of the invention will become apparent to those of ordinary skill in the art upon review of the following description of the preferred embodiment of the invention, reference being made to the appended drawings.

Figure 1:
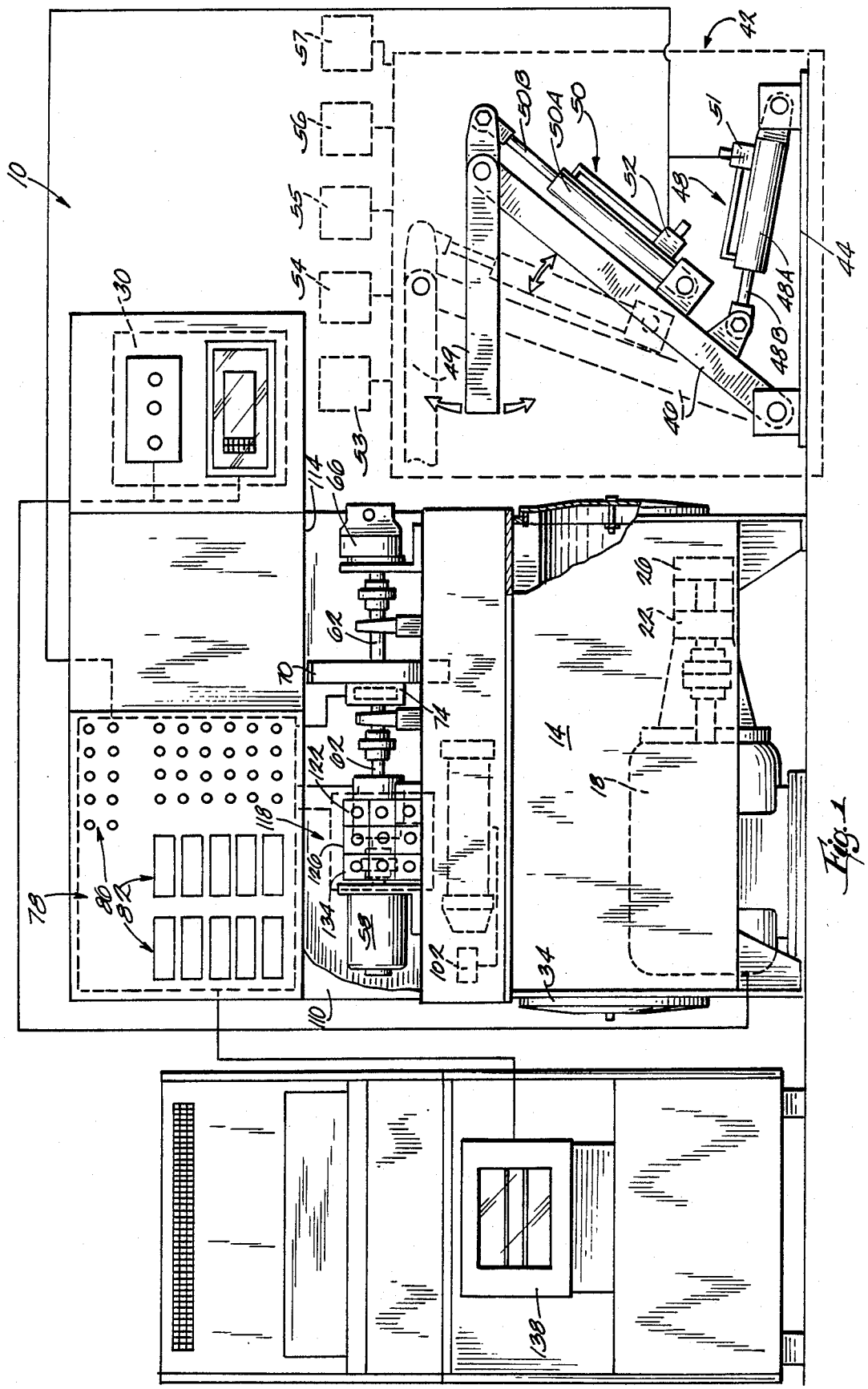
FIG. 1 is a front elevational view of a fluid power demonstration facility embodying various of the features of the invention.
Figure 2:
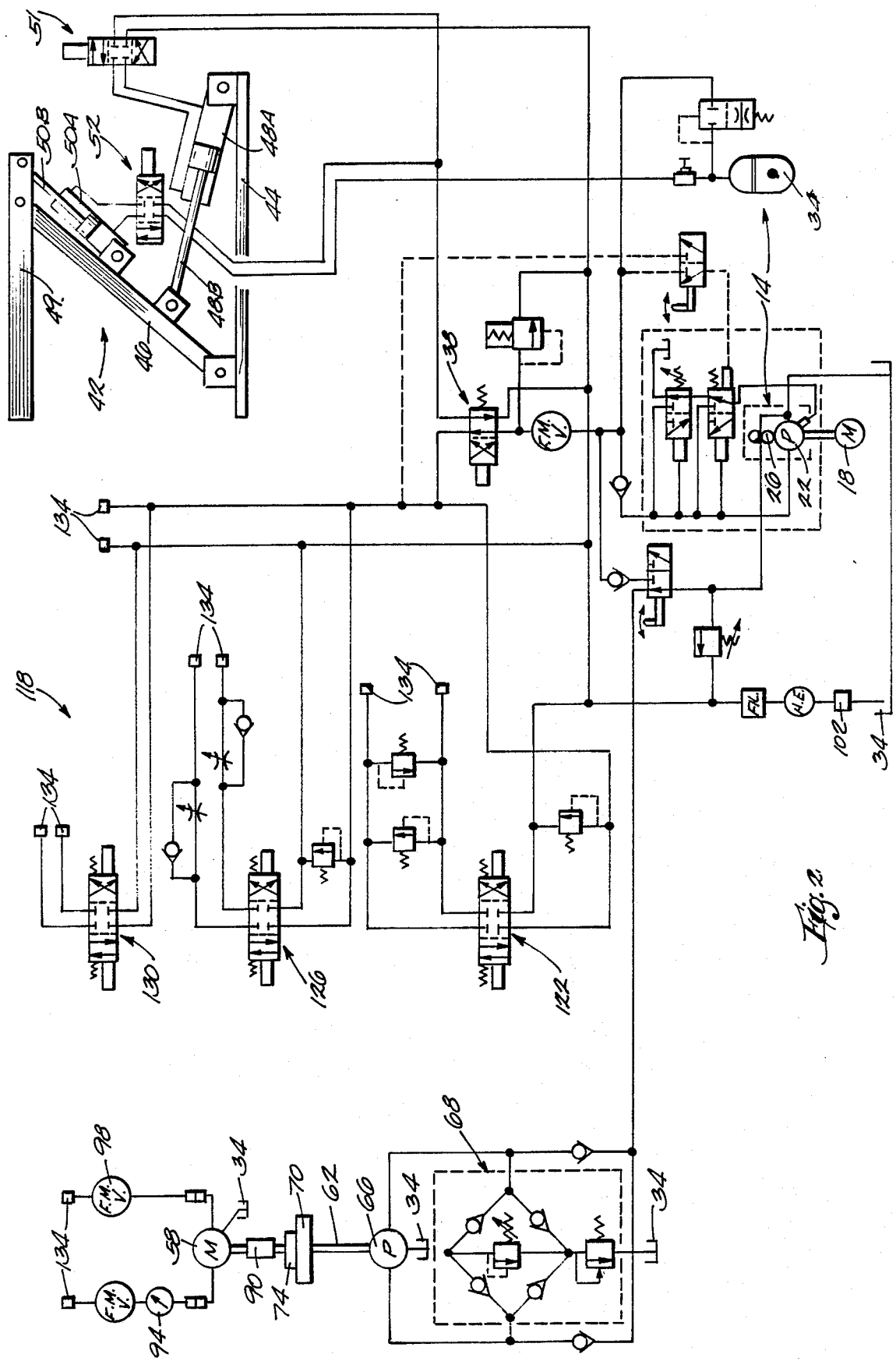
FIG. 2 is a schematic view showing fluid connections between various components of the fluid power demonstration facility shown in FIG. 1.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT OF THE INVENTION

Shown in the various figures is a fluid power demonstration facility 10 embodying various of the features of the invention. More particularly, the fluid power demonstration facility 10 of the preferred embodiment of the invention is adapted to demonstrate hydraulic power.

The demonstration facility 10 comprises means defining a fluid power source. While various other means could be employed, in the illustrated embodiment this means comprises a hydraulic power source 14. More particularly, in the illustrated embodiment, the hydraulic power source 14 comprises an industrial size electric motor 18. Still more particularly, the electric motor 18 is a 20 HP motor.

The hydraulic power source 14 further includes a hydraulic pump 22 driven by the electric motor 18. More particularly, the hydraulic pump 22 is a variable displacement, pressure compensated piston pump Advantages achieved using this type of pump include safety, as the piston pump 22 will not produce excessive pressure, and conservation of power.

The hydraulic power source 14 further comprises an auxiliary hydraulic pump 26 driven by the electric motor 18, the function of which pump will later be described.

The speed of the electric motor 18, which motor drives the pumps 22 and 26, is electrically controlled by a variable frequency drive controller 30.

The hydraulic power source 14 further comprises an reservoir 34 containing hydraulic fluid.

The demonstration facility 10 further includes directing means in fluid communication with the power source 14 and for selectively supplying fluid power from the fluid power source. While various other means could be employed, in the illustrated embodiment the directing means comprises a valve 38.

The demonstration facility 10 further includes prearranged linear means, in plumbed connection with the valve 38, and selectively engageable by the valve 38, for demonstrating linear motion produced in response to fluid power. While various other means could be employed, in the illustrated embodiment the linear means comprises a robotic arm 42. More particularly, the robotic arm 42 includes a first arm member 44, a second arm member 46 pivotally mounted to the first arm member 44, and a hydraulic cylinder 48 connected between the first arm member 44 and the second arm member 46 to effect pivotal movement of the second arm member 46 with respect to the first arm member 44. More particularly, the hydraulic cylinder 48 comprises a cylinder housing 48A, and a rod 48B movable relative to the cylinder housing 48A to effect the pivotal movement of the second arm member 46 with respect to the first arm member 44. The hydraulic cylinder 48 changes from being in compression, when the second arm member 46 is oriented as illustrated in solid outline, to being in tension, after the second arm member 46 makes an angle of more than 90° with the first arm member 44, during its stroke. The robotic arm 42 of the illustrated embodiment further includes a third arm member 49 pivotally mounted to the second arm member 46, and a second hydraulic cylinder 50 connected between the second arm member 46 and the third arm member 49 to effect pivotal movement of the third arm member 49 with respect to the second arm member 46. More particularly, the cylinder 50 comprises a cylinder housing 50A, and a rod 50B movable relative to the cylinder housing 50A to effect the pivotal movement of the third arm member 49 with respect to the second arm member 46. The hydraulic cylinders 48 and 50 include valves 51 and 52, respectively, which valves are hydraulically connected to the power source 14. The demonstration facility 10 also includes sensors in communication with the robotic arm 42, the inclusion of any of which is optional. The demonstration facility 10 of the illustrated embodiment includes sensors 53 sensing the pressure of hydraulic fluid supplied to the valves 51 and 52, sensors 54 sensing the flow rate of hydraulic fluid supplied to the valves 51 and 52, a sensor 55 sensing force applied to the free end of third arm member 49, and sensors 56 and 57 sensing the positions of the rods 48B and 50B relative to the cylinder housings 48A and 50A, respectively.

The demonstration facility 10 further includes prearranged rotary means selectively plumbed with the valve 38, for selective engagement by the directing means, for demonstrating rotational motion produced in response to fluid power and adapted to be selectively engageable by the valve 38. While various other means can be employed, in the illustrated embodiment the rotary means comprises a motor 58 which includes an elongate, rotatable shaft 62, and which is adapted to be powered by the power source 14. In the illustrated embodiment the motor 58 is reversible with regard to direction of rotation.

The demonstration facility 10 further includes a pump 66 drivingly connected to the shaft 62, in fluid communication with the power source 14, and defining a load on the motor 58.

The demonstration facility 10 further includes a load valve 68 defining a variable load on the pump 66. The load valve 68 includes check valves arranged in a manner wherein a load is provided regardless of the direction in which the motor 58 is rotating.

While other configurations could be employed, in the illustrated embodiment, the pump 66 is in fluid communication with the auxiliary pump 26, and is supercharged by the auxiliary pump 26 to define, with the load valve 68, the load on the motor 58. More particularly, the pump 66 is said to be supercharged when the auxiliary pump 26 pumps fluid through the pump 66 in the direction in which fluid normally flows in response to rotation of the shaft 62. This supercharging is performed to prevent cavitation from occurring in the pump 66.

The demonstration facility 10 further includes a flywheel 70 on the shaft 62, and an electrically operable clutch 74 selectively coupling the flywheel 70 to the shaft 62 for common rotation of the flywheel 70 and the shaft 62.

The demonstration facility 10 further includes a control and display console 78 which includes display readouts 82 displaying values sensed by various sensors, such as the sensors 53, 54, 55, 56, and 57, and other sensors which will next be described, and which console includes a plurality of control knobs and switches 86. One of the knobs and switches 86 electrically operates the clutch 74. The valves 51 and 52 of the robotic arm 42 are also electrically connected to the control and display console 78, and more particularly to the knobs and switches 86, so that pivotal movement of the arm members 46 and 49 can be controlled by the control and display console 78.

The demonstration facility 10 further includes a sensor which measures speed of rotation of the shaft 62. The demonstration facility 10 further includes a sensor which measures torque developed by the motor 58. In the illustrated embodiment, a sensor 90 is mechanically connected to the shaft 62, and measures both speed of rotation of the shaft 62 and torque developed by the motor 58.

The demonstration facility 10 further includes a sensor 94 sensing fluid pressure between the power source 14 and the motor 58.

The demonstration facility 10 further includes a sensor 98 sensing fluid flow rate through the motor 58.

The demonstration facility 10 further includes an electronic temperature sensor 102 adapted to sense the temperature of fluid pumped from the pump 22, and a heat exchanger 106 in fluid communication with the hydraulic pump 22 and responsive to the temperature sensor 102.

The demonstration facility 10 further includes a safety shield 110 covering at least the motor 58. In the illustrated embodiment, the safety shield is a transparent cover covering the motor 58, the sensor 90, the flywheel 70, the clutch 74, and the pump 66, and can be lifted or hinged about an axis 114, for example, to allow access to the motor 58, the sensor 90, the flywheel 70, the clutch 74, and the pump 66.

The demonstration facility 10 further includes supply control means, in fluid communication with the valve 38, for controlling fluid power from the power source 14. While various other means could be employed, in the illustrated embodiment the supply control means includes a stack valve manifold 118 comprising a plurality of selectable valves, and electronic means for operating a selected one of the valves. The operating means can comprise, for example, the control and display console 78.

In the illustrated embodiment, the selectable valves comprise different types of valves. The selectable valves can comprise, for example, a pressure control valve or a flow control valve. In the illustrated embodiment, the selectable valves comprise at least two different types of valves selected from a group of types consisting essentially of on/off, proportional, servo, and manual valves. More particularly, in the illustrated embodiment, the stack valve manifold 118 comprises an on/off valve 122, a proportional valve 126, and a proportional valve 130. While various other models could be employed, an appropriate model of proportional valve for the valves 126 and 130 is available from Vickers, Incorporated, Troy, Mich. as model series KDG1-3/5A. Although either of the valves 126 and 130 can be connected for open loop or closed loop control, in the illustrated embodiment, the proportional valve 130 is connected for open loop control by the control and display console 78, and the proportional valve 126 is connected for closed loop control by the control and display console 78 so that speed of rotation of the shaft 62 is maintained generally constant by the control and display console 78 regardless of the pump 66 and the flywheel 70.

The stack valve manifold 118 is adapted for fluid connection between the power source 14 and the motor 58. To this end, the fluid power demonstration facility includes quick-disconnect connectors 134 which allow selection of one of the valves 122, 126 and 130 from the stack valve manifold 118, and which allow fluid communication between the selected valve and the motor 58. The stack valve manifold 118 can optionally be used without connection to the motor 58 for the purpose of observing valve characteristics using the display readouts 82, for example. The stack valve manifold 118 can also be used with the robotic arm 42.

The demonstration facility 10 optionally further includes a computer 138. The computer 138 can be used as the electronic means for operating a selected one of the valves 122, 126, and 130, or for operating the valves 51 and 52. In the illustrated embodiment, the demonstration facility 10 includes electronic sensing means for sensing a condition at the rotary means, the sensing means communicating with the computer 138, and the computer 138 storing information received from the sensing means. While various other means could be employed, in the illustrated embodiment the sensing means comprises at least one of the sensors 90, 94 and 98, and/or the valve 126 operating in closed loop control with either the computer 138 or the control and display console 78. In the illustrated embodiment, the demonstration facility 10 includes electronic sensing means for sensing a condition at the linear means, the sensing means communicating with the computer, and the computer storing information received from the sensing means. While various other means could be employed, in the illustrated embodiment, the means for sensing a condition at the linear means comprises at least one of the sensors 53, 54, 55, 56, and 57, and/or one of the valves 51 and 52. In the illustrated embodiment, the computer is programmed to analyze the stored information and can generate, for example, a transfer function, by using standard numerical analysis techniques, in response to the information stored from the sensing means.

The computer 138 is further programmed to use the positions of the rods 48B and 50B relative to the cylinder housings 48A and 50A, respectively, sensed by the sensors 56 and 57, respectively, to calculate speed and acceleration of the rods 48B and 50B relative to the cylinder housings 48A and 50A. Speed is calculated by taking a first derivative of position with respect to time, and acceleration is calculated by taking a second derivative of position with respect to time. This position, speed and acceleration information regarding the rods 48B and 50B relative to the cylinder housings 48A and 50A, respectively, is used by the computer 138 to calculate position, speed and acceleration of the free end of the third arm member 49.

Various features of the invention are set forth in the following claims.

We claim:

1. A fluid power demonstration facility comprising means defining a fluid power source, directing means connected in fluid communication with said fluid power source for selectively supplying fluid power from said fluid power source, pre-arranged rotary means selectively plumbed with said directing means for selective operation by said directing means and for demonstrating rotational motion produced in response to fluid power, said rotary means including a motor which comprises an elongate, rotatable shaft and which is adapted to be powered by said fluid power source, said demonstration facility further comprising means defining a selectively engageable inertial load on said shaft for selectively affecting dynamic response time of said rotary means, said selectively engageable means comprising a flywheel on said shaft and an electrically operable clutch selectively coupling said flywheel to said shaft for common rotation of said flywheel and said shaft, and said demonstration facility further comprising pre-arranged linear means in plumbed connection with said directing means, and selectively operable by said directing means, for demonstrating linear motion produced in response to fluid power.

2. A fluid power demonstration facility in accordance with claim 1 and further including a sensor sensing fluid pressure at at least one of said means for demonstrating rotational motion and said means for demonstrating linear motion.

3. A fluid power demonstration facility in accordance with claim 2 and further including a sensor sensing fluid flow through at least one of said means for demonstrating rotational motion and said means for demonstrating linear motion.

4. A fluid power demonstration facility in accordance with claim 1 and further including supply control means in fluid communication with said directing means for controlling fluid power from said fluid power source.

5. A fluid power demonstration facility in accordance with claim 4 wherein said directing means comprises a valve operative to supply fluid power to at least one of said linear means and said supply control means, and wherein said supply control means is adapted to control fluid communication between said directing means and said rotary means.

6. A fluid power demonstration facility in accordance with claim 5 wherein said supply control means includes a stack valve manifold comprising a plurality of selectable valves, and electronic means for operating a selected one of said valves.

7. A fluid power demonstration facility in accordance with claim 6 wherein said selectable valves comprise different types of valves.

8. A fluid power demonstration facility in accordance with claim 6 wherein said selectable valves comprise a pressure control valve.

9. A fluid power demonstration facility in accordance with claim 8 wherein said selectable valves comprise a flow control valve.

10. A fluid power demonstration facility in accordance with claim 6 wherein said selectable valves comprise at least two different types of valves selected from a group of types consisting essentially of on/off, proportional, and servo valves.

11. A fluid power demonstration facility in accordance with claim 6 and further comprising a computer defining said electronic operating means.

12. A fluid power demonstration facility in accordance with claim 11 and further including sensing means for sensing a condition at said rotary means, said sensing means communicating with said computer, and said computer storing information received from said sensing means.

13. A fluid power demonstration facility in accordance with claim 12 wherein said computer is adapted to analyze said stored information.

14. A fluid power demonstration facility in accordance with claim 11 and further including sensing means for sensing a condition at said linear means, said sensing means communicating with said computer, and said computer storing information received from said sensing means.

15. A fluid power demonstration facility in accordance with claim 14 wherein said computer is adapted to analyze said stored information.

16. A fluid power demonstration facility in accordance with claim 1 wherein said linear means comprises a robotic arm.

17. A fluid power demonstration facility in accordance with claim 16 wherein said robotic arm includes a first arm member, a second arm member pivotally mounted to said first arm member, and a hydraulic cylinder connected between said first arm member and said second arm member to effect pivotal movement of said second arm member with respect to said first arm member, said hydraulic cylinder changing from being in tension to being in compression during its stroke.

18. A fluid power demonstration facility with claim 1 and further including a safety shield covering at least said motor.

19. A fluid power demonstration facility in accordance with claim 1 and further including a load valve, and a pump drivingly connected to said shaft and in fluid communication with said fluid power source and said load valve, said load valve and said pump defining a load on said motor.

20. A fluid power demonstration facility in accordance with claim 1 and further including a sensor which measures speed of rotation of said shaft.

21. A fluid power demonstration facility in accordance with claim 1 and further including a sensor which measures torque developed by said motor.

22. A fluid power demonstration facility in accordance with claim 1 wherein said fluid power source comprises an industrial size electric motor, and a hydraulic pump driven by said electric motor.

23. A fluid power demonstration facility in accordance with claim 22 wherein said electric motor has proximate 20 horsepower.

24. A fluid power demonstration facility in accordance with claim 22 wherein said hydraulic pump is a variable displacement, pressure compensated piston pump.

25. A fluid power demonstration facility in accordance with claim 22 and further comprising an auxiliary hydraulic pump driven by said electric motor, wherein said rotary means includes a hydraulic motor powered by said hydraulic pump, and including a rotatable shaft, said fluid power demonstration facility further comprising a load pump drivingly connected to said shaft and in fluid communication with said auxiliary hydraulic pump.

26. A hydraulic demonstration facility comprising means defining a hydraulic power source, a hydraulic motor in fluid communication with said hydraulic power source and including an elongated shaft which is rotatable in response to hydraulic power being supplied to said hydraulic motor from said hydraulic power source, a load valve, and a hydraulic pump in fluid communication with said load valve, driven by said shaft and supercharged by said hydraulic power source, said hydraulic pump and said load valve thereby defining a load on said hydraulic motor.

27. A hydraulic demonstration facility in accordance with claim 26 and further including a sensor sensing fluid pressure between said hydraulic power source and said hydraulic motor.

28. A hydraulic demonstration facility in accordance with claim 27 and further including a sensor sensing fluid flow rate through said hydraulic motor.

29. A hydraulic demonstration facility in accordance with claim 26 and further including a stack valve manifold comprising a plurality of valves adapted for fluid connection between said hydraulic power source and said hydraulic motor, and electronic means for operating a selected one of said valves.

30. A hydraulic demonstration facility in accordance with claim 29 and further including means for demonstrating linear motion produced in response to hydraulic power, and directing means, in fluid connection between said stack valve manifold and said hydraulic power source, for effecting selection of fluid communication of at least one of said linear means and said hydraulic motor with said hydraulic power source.

31. A hydraulic demonstration facility in accordance with claim 30 wherein said linear means comprises a robotic arm.

32. A hydraulic demonstration facility in accordance with claim 31 wherein said robotic arm includes a first arm member, a second arm member pivotally mounted to said first arm member, and a hydraulic cylinder connected between said first arm member and said second arm member, for pivotal movement of said second arm member with respect to said first arm member, and wherein said hydraulic cylinder changes from being in tension to being in compression during its stroke.

33. A hydraulic demonstration facility in accordance with claim 29 wherein said selectable valves comprise different types of valves.

34. A hydraulic demonstration facility in accordance with claim 29 wherein said selectable valves comprise a pressure control valve.

35. A hydraulic demonstration facility in accordance with claim 29 wherein said selectable valves comprise a flow control valve.

36. A hydraulic demonstration facility in accordance with claim 29 wherein said selectable valves comprise at least two different types of valves selected from a group of types consisting essentially of on/off, proportional, and servo valves.

37. A hydraulic demonstration facility in accordance with claim 29 and further comprising a computer defining said operating means.

38. A hydraulic demonstration facility in accordance with claim 37 and further including electronic sensor means for sensing a condition at said hydraulic motor, said sensor means communicating with said computer, and said computer storing information received from said sensor means.

39. A hydraulic demonstration facility in accordance with claim 38 wherein said computer is adapted to analyze said stored information.

40. A hydraulic demonstration facility in accordance with claim 37 and further including electronic sensor means for sensing a condition at said stack valve manifold, said sensor means communicating with said computer, and said computer storing information received from said sensor means.

41. A hydraulic demonstration facility in accordance with claim 40 wherein said computer is adapted to analyze said stored information.

42. A hydraulic demonstration facility in accordance with claim 26 and further including a safety shield covering at least said hydraulic motor.

43. A hydraulic demonstration facility in accordance with claim 26 and further including a flywheel on said shaft, and an electrically operable clutch selectively coupling said flywheel to said shaft for common rotation of said flywheel and said shaft.

44. A hydraulic demonstration facility in accordance with claim 26 and further including a sensor which measures speed of rotation of said shaft.

45. A hydraulic demonstration facility in accordance with claim 26 and further including a sensor which is mechanically connected to said shaft and which measures torque developed by said hydraulic motor.

46. A hydraulic demonstration facility in accordance with claim 26 wherein said hydraulic power source comprises an industrial size electric motor, and a second hydraulic pump driven by said electric motor.

47. A hydraulic demonstration facility in accordance with claim 46 wherein said electric motor has proximate 20 horsepower.

48. A hydraulic demonstration facility in accordance with claim 46 and further including an electronic temperature sensor adapted to sense the temperature of hydraulic fluid pumped from said second hydraulic pump, and a heat exchanger in fluid communication with said second hydraulic pump and responsive to said temperature sensor.

49. A hydraulic demonstration facility in accordance with claim 46 wherein said hydraulic pump is a variable displacement, pressure compensated piston pump.

50. A fluid power demonstration facility comprising means defining a fluid power source, directing means connected in fluid communication with said fluid power source for selectively supplying fluid power from said fluid power source, pre-arranged rotary means, selectively plumbed with said directing means, for selective engagement by said directing means and for demonstrating rotational motion produced in response to fluid power, said rotary means includes a motor which comprises an elongated rotatable shaft and which is adapted to be powered by said fluid power source, said demonstration facility further comprising a load valve, and a pump drivingly connected to said shaft and in fluid communication with said fluid power source and said load valve, said load valve and said pump defining a load on said motor, and said demonstration facility further comprising pre-arranged linear means in plumbed connection with said directing means, and selectively engageable by said directing means, for demonstrating linear motion in response to fluid power.

51. A fluid power demonstration facility comprising means defining a fluid power source, said fluid power source comprising an electric motor, and a hydraulic pump driven by said electric motor, said demonstration facility further comprising directing means connected in fluid communication with said fluid power source for selectively supplying fluid power from said fluid power source, pre-arranged rotary means including a hydraulic motor powered by said hydraulic pump and including a rotatable shaft, said rotary means being selectively plumbed with said directing means for selective engagement by said directing means and for demonstrating rotational motion produced in response to fluid power, pre-arranged linear means in plumbed connection with said directing means, and selectively engageable by said directing means, for demonstrating linear motion produced in response to fluid power, an auxiliary hydraulic pump driven by said electric motor, and a load pump drivingly connected to said shaft and in fluid communication with said auxiliary hydraulic pump.

52. A fluid power demonstration facility comprising means defining a fluid power source, rotary means for demonstrating rotational motion produced in response to fluid power, said rotary means including a motor which comprises an elongate, rotatable shaft and which is adapted to be powered by said fluid power source, said demonstration facility further comprising a flywheel on said shaft and an electrically operable clutch selectively coupling said flywheel to said shaft for common rotation of said flywheel and said shaft.

53. A fluid power demonstration facility comprising means defining a fluid power source, rotary means for demonstrating rotational motion produced in response to fluid power, said rotary means including a motor which comprises an elongate, rotatable shaft and which is adapted to be powered by said fluid power source, said demonstration facility further comprising a load valve, and a pump drivingly connected to said shaft and in fluid communication with said fluid power source and said load valve, said load valve and said pump defining a load on said motor.

* * * * *